United States Patent [19]
Price

[11] 4,347,884
[45] * Sep. 7, 1982

[54] TIRE LINER AND METHOD OF PREPARATION

[75] Inventor: Donald R. Price, Lansing, Mich.

[73] Assignees: Harold Harry Vischer, Brooklyn; Harold Harrison Vischer, Jr.; Michael Louis Vischer, both of Jackson; Ian Campbell McLeod, Lansing; Charles Edward Sherry, Holt, all of Mich.

[*] Notice: The portion of the term of this patent subsequent to Apr. 21, 1998, has been disclaimed.

[21] Appl. No.: 253,102

[22] Filed: Apr. 13, 1981

Related U.S. Application Data

[63] Continuation-in-part of Ser. No. 51,720, Jan. 25, 1979, Pat. No. 4,262,719.

[51] Int. Cl.³ ............................................. B60C 17/00
[52] U.S. Cl. .................................... 152/158; 152/195; 152/204; 152/348; 156/121
[58] Field of Search .................... 156/123 R, 129, 121, 156/110 R, 153; 152/204, 158, 346, 347, 348, 192, 195

[56] References Cited

U.S. PATENT DOCUMENTS

| | | | |
|---|---|---|---|
| 1,181,065 | 1/1916 | Coffield | 152/20 X |
| 1,399,575 | 12/1921 | Privett | 152/30 X |
| 1,829,483 | 10/1931 | Hibbert | 152/195 |
| 3,964,949 | 6/1976 | Kent et al. | 156/96 |
| 4,046,947 | 9/1977 | Brodie | 428/352 |
| 4,262,719 | 4/1981 | Price | 152/20 X |
| 4,263,074 | 4/1981 | Price | 152/20 X |

*Primary Examiner*—Michael W. Ball
*Attorney, Agent, or Firm*—Ian C. McLeod

[57] ABSTRACT

An improved tire liner composed of high temperature and pressure (HPT) molded and vulcanized rubber with a cross-section having two opposite long sides and two opposite short sides is described. One long side of the liner to be positioned across the U-shaped surface of the tire casing or the inside air space of the casing is beveled along its edges so that it tapers into the short sides. In some instances both long sides are tapered along the edges into the short sides. The tire liner reduces flat tires caused by punctures through the tire casing.

10 Claims, 4 Drawing Figures

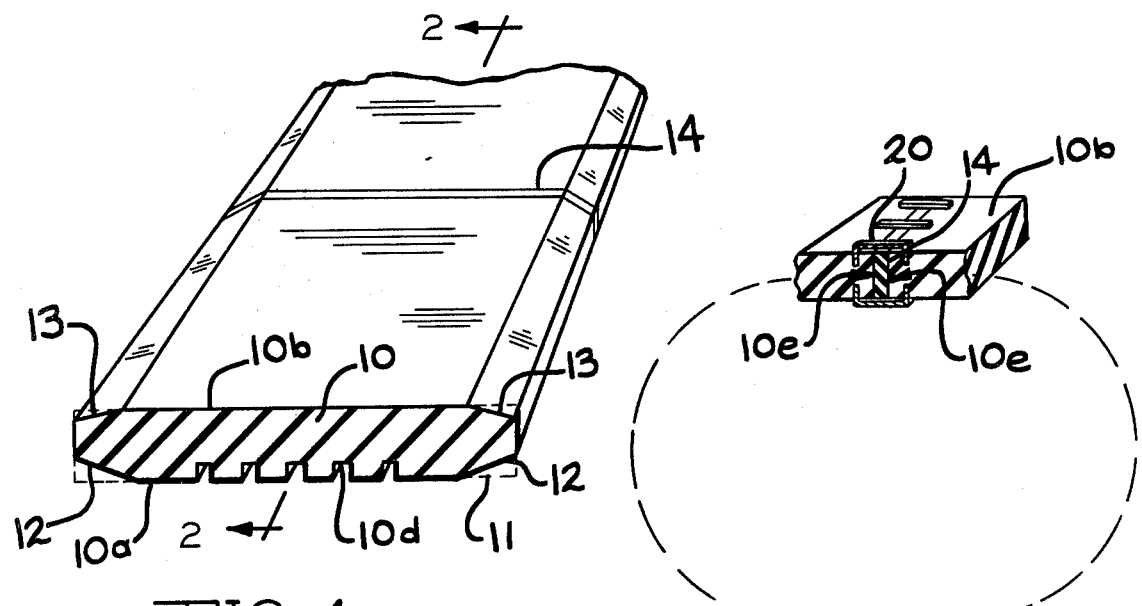
FIG. 1
FIG. 2
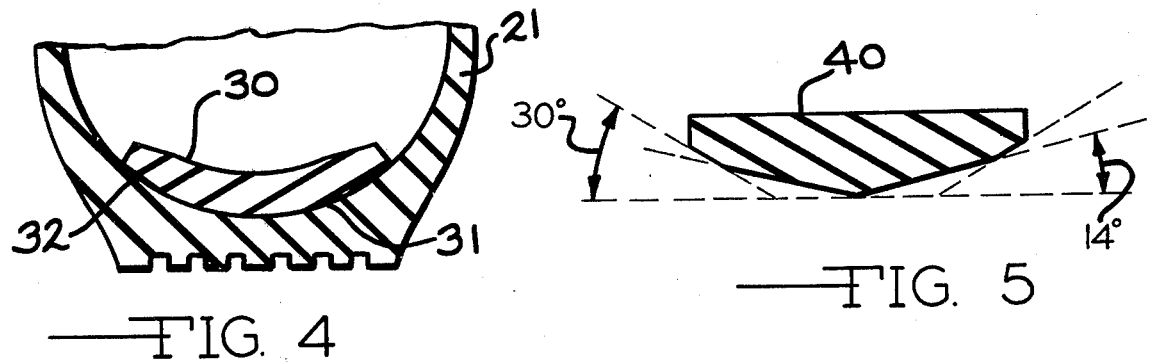
FIG. 4
FIG. 5
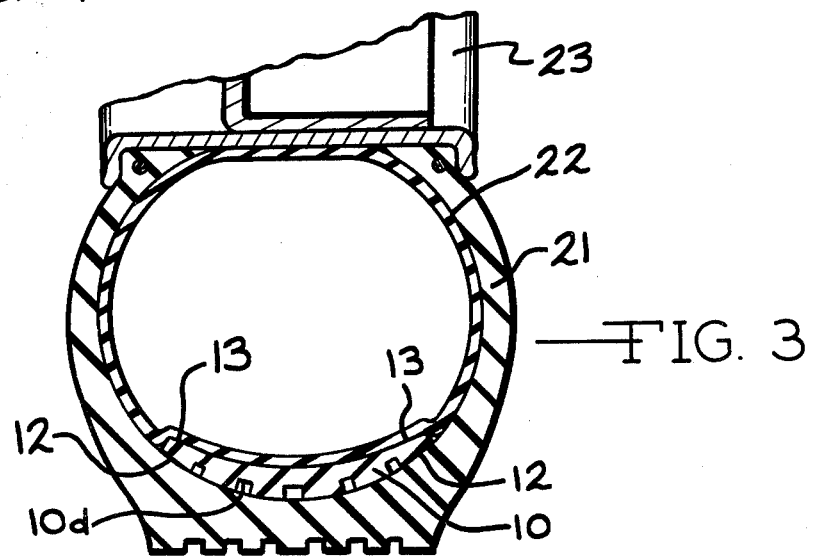
FIG. 3

TIRE LINER AND METHOD OF PREPARATION

CROSS-REFERENCE TO RELATED APPLICATION

This application is a continuation-in-part of U.S. application Ser. No. 051,720, filed Jan. 25, 1979, now U.S. Pat. No. 4,262,719.

BACKGROUND OF THE INVENTION

An improved tire liner incorporating high temperature and pressure (HPT) molded and vulcanized rubber is described. The liner is adapted to fit into a tire casing to prevent flat tires.

PRIOR ART

The prior art has described many different types of tire liners some of which are discussed in my co-pending application Ser. No. 051,720. One tire liner particularly related to the present invention which is not discussed in the prior application is described in U.S. Pat. No. 1,181,065 to Coffield (1916). As can be seen from FIG. 2 of this patent, a rubber liner is described which is premolded to conform to the shape of the U-shaped cross-section of the tire casing. It is believed that the rubber of Coffield was not molded under high pressures or temperatures, and thus was relatively soft. Also the Coffield type liner is not bent into place by the aired inner tube because of its pre-molded shape. It has been found by applicant that without this bending by the inner tube or by vulcanizing the liner to the tire casing, the tire liner does not "lock" or tightly grip the tire casing. As a result the liner is believed to tend to work loose and/or slip during rotation of the tire particularly during acceleration and decleration, and thereby injure the casing or inner tube due to heat and friction. Applicant's liners as described in Ser. No. 051,720 have been found to be free from the problem of heat buildup and friction. The liner is preferably built to fit just in the triad area (opposite) thus staying away from the high flex area of the tire thereby allowing the heat caused by flexing to disperse through the wheel assembly of the tire. This problem is believed to be the reason that the Coffield type tire liner did not gain acceptance by the prior art.

OBJECTS

It is therefore an object of the present invention to provide an improved tire liner of the kind which bends into the tire casing when forced into position by the aired inner tube or when vulcanized to the tire casing thus tending to "lock" the liner into place in the tire casing and which tends to straighten or flatten when outside of the tire casing. Further it is an object of the present invention to provide a tire liner and method for its production which is simple and economical. These and other objects will become increasingly apparent by reference to the following description and the drawings.

IN THE DRAWINGS

FIG. 1 is a front partial cross-sectional projection view of a HPT rubber strip of a tire liner with the long sides tapered into the short sides as shown inside broken lines which show material removed by the method from a rectangular cross-sectioned strip by beveling.

FIG. 2 is a partial side cross-sectional projection view of the rubber strip of FIG. 1 showing the annular ring in dotted lines and a joint across the strip.

FIG. 3 is a front cross-sectional view of the tire liner of FIGS. 1 and 2 bent into a tire casing by an inner tube and not vulcanized to the casing, wherein the tire is mounted on a conventional rim.

FIG. 4 is a front cross-sectional view of a tire liner which is tapered at four (4) different angles across the surfaces of the long side which is to be bent into contact with the inside of the tire casing.

GENERAL DESCRIPTION

The present invention relates to an annular shaped tire liner adapted to fit around and in contact with the inside of a casing which is part of a pneumatic tire and around and in contact with the outside of an inner tube for the tire so as to be between the inner tube and the casing and to be vulcanized to the inside of the casing without an inner tube to reduce the frequency of flat tires wherein the casing has a generally U-shaped surface inside and wherein the casing has spaced apart annular sidewalls supporting a tread the improvement which comprises: an annular strip of high temperature and pressure molded and vulcanized rubber with two opposite long sides and two opposite short sides, wherein the strip has a width defined by the two opposite long sides and a thickness along the length between two opposite short sides which provides for substantial protection against and resistance to penetration of the inside of the casing by a foreign object, wherein the annular strip is in compression by the casing and is bent into the U-shape of the casing adjacent the tread when positioned in the casing by the aired inner tube and by vulcanizing to the casing without an inner tube and tends to straighten when outside of the casing thus holding the liner in position in the casing in use and, wherein a portion of one long side of the strip which is to be in contact with the tire casing or the inside of the casing adjacent each of the short sides has tapered edges into the short sides.

The present invention further relates to the improved method of forming an annular shaped tire liner from a high temperature and pressure molded and vulcanized rubber strip which is adapted to fit around and in contact with the inside of a casing which is part of a pneumatic tire and around and in contact with the outside of an inner tube for the tire so as to be between the inner tube and the casing and to be vulcanized to the casing without an inner tube to reduce the frequency of flat tires wherein the casing has a generally U-shaped surface inside and wherein the tire has spaced apart annular sidewalls supporting a tread which comprises providing a strip of the rubber having a generally four sided cross-section such that there are two opposite long sides and two opposite short sides; and beveling at least the long side of the strip to be adjacent the tread of the tire casing or the inside of the casing with a rubber cutting or buffing means into the short sides.

The composition and method of formation of the HPT molded and vulcanized rubber is described in U.S. application Ser. No. 051,720. Preferably, the rubber is "precured" as a flat strip with a rectangular cross-section, i.e. molded and heat vulcanized at 21 to 70.3 kg per sq. cm. at temperatures above about 149° C. Also various rubber bonding or vulcanizing methods are described in this prior application. These rubber processing methods are known to those skilled in the art.

SPECIFIC DESCRIPTION

As shown in FIG. 1, a flat rectangular strip 10 of precured tread type rubber having the cross-section shown in FIG. 1 with the broken lines 11 (Bandag Inc., Muscatine, Iowa) measuring 7 inches (12.8 cm) width by ½ inch (1.3 cm) thick was used. The long sides 10a and 10b provide the width and the short sides 10c provide the thickness of the finished tire liner. The strip 10 optionally has a tread pattern 10d. The long side 10a to be next to the tire casing was beveled towards the short side 10c using a rubber buffing wheel to a taper of about 1½ inches (3.8 cm) wide and at an angle of about 15° to the side 10a to form tapered surfaces 12. The short sides were reduced in thickness to about ⅛ inch (0.32 cm). The ends 10e of the strip 10 FIG. 2, were then joined together to form an annular strip using a thin strip 14 of "cushion" type rubber with an adhesive for bonding as described in U.S. application Ser. No. 051,720, filed Jan. 25, 1979. The ends 10e were also stapled 20 as shown in FIG. 2 to hold them in place for curing. The ends 10e were vulcanized together using a conventional inner tube repair device, which consists of two heated metal plates one on the top and one on the bottom of the splice (not shown). Pressure was placed on the plates and then they were heated at 298° F. and 35 psig for 20 minutes. The staples 20 were then removed to prevent them from injuring the inner tube 22 and tire casing 21 when the liner 10 was in use.

It was found that the tread pattern 10d did not make any difference in use and thereafter plain or "slick" rubber with no pattern was used. In some instances the long side 10b to be adjacent the inner tube 22 was also slightly beveled to provide tapered surfaces 13 to prevent injury to the inner tube because of sharp edges. The tapered surfaces 13 on side 10a were roughened by the rubber cutting means.

It will be recognized that various means can be used to hold the ends 10e of the strip 10 together during vulcanizing of the ends 10c. The staples 20 provide a convenient means for holding the splice together.

FIG. 3 shows the annular tire liner 10 bent into position in the casing 21 by the inner tube 22 when the tube 22 and casing 21 are mounted on a rim 24. The tire liner 10 performed well in service. FIG. 4 shows a tire liner 30 in a casing 21 vulcanized to the casing with cushion rubber 31 with the tapered surfaces 32 on either side. FIG. 5 shows a liner 40 wherein the long side has four (4) angles (two at 30° and two at 15°). This provides a more rounded cross-section.

The flat rectangular strip could be formed into a ring and then the long side(s) beveled. Also it will be appreciated that the tire liner could be precured as a ring without a joint or splice prior to beveling.

Finally, it will be appreciated that the beveled or tapered side can be facing the air space inside of the casing 21 rather than the U-shaped surface. This means that the liner 10 shown in FIG. 3 is turned over in the casing 21.

It will be appreciated that a curved annular template can be made, such as by cutting out the tread and shoulder area of a tire that is the same size as the liner being produced, and placing a liner in the template so that the edges of the liner can be buffed or cut to form a smooth good fitting tire liner.

I claim:

1. In an annular shaped tire liner adapted to fit around and in contact with the inside of a casing which is part of a pneumatic tire and around and in contact with the outside of an inner tube for the tire so as to be between the inner tube and the casing and to be vulcanized to the inside of the casing without an inner tube to reduce the frequency of flat tires wherein the casing has a generally U-shaped surface inside and wherein the tire has spaced apart annular sidewalls supporting a tread the improvement which comprises:
    an annular strip of high temperature and pressure molded and vulcanized rubber with two opposite long sides and two opposite short sides,
    wherein the strip has a width defined by the two opposite long sides and a thickness along the length between the two opposite short sides which provides for substantial protection against and resistance to penetration of the inside casing by a foreign object,
    wherein the annular strip is in compression by the casing and is bent into the U-shape of the casing adjacent the tread when positioned in the casing by the inner tube and by vulcanizing to the casing without an inner tube and tends to straighten when outside of the casing thus holding the liner in position in the casing in use, and
    wherein a portion of one long side of the strip which is to be in contact with the tire casing or the inside of the casing adjacent each of the short sides has tapered edges into the short sides.

2. In an annular shaped tire liner adapted to fit around and in contact with the inside of a casing which is part of a pneumatic tire and around and in contact with the outside of an inner tube for the tire so as to be between the inner tube and the casing without being attached to reduce the frequency of flat tires wherein the casing has a generally U-shaped surface inside and wherein the tire has spaced apart annular sidewalls supporting a tread the improvement which comprises:
    (a) an annular strip of high temperature and pressure molded and vulcanized rubber defining an annular length and with a cross-section having two opposite long sides and two opposite short sides;
    wherein the strip has a width defined by the two opposite long sides and a thickness along the length between the two opposite short sides which provides for substantial protection against and resistance to penetration of the inside of the casing by a foreign object and having at least one joint across the width of the strip;
    wherein the annular strip is in compression in the casing and is bent into the U-shape of the casing adjacent the tread when positioned in the casing by the inner tube and tends to straighten when outside of the casing thus holding the liner in position in the casing in use, and
    wherein a portion of one long side of the strip which is to be in contact with the tire casing or the inside of the casing adjacent each of the short sides has been beveled by a rubber cutting means to provide tapered edges into the short sides; and
    (b) a thin section of a low temperature and pressure vulcanized rubber material in a joint across the annular strip.

3. The tire liner of claims 1 or 2 wherein the rubber is high temperature and pressure molded and vulcanized rubber has been molded and vulcanized under a pressure of about 21 to 70.3 kg per sq cm and at a temperature above about 149° C. as a flat rectangular cross-sectional strip and formed into the annular strip.

4. The tire liner of claims 1 or 2 bent and vulcanized to the U-shaped surface of the tire casing which is mounted on a wheel rim without an inner tube.

5. The tire liner of claims 1 or 2 bent and held against the U-shaped surface of the tire casing without vulcanizing to the casing and with the inner tube against the liner and with the tire and inner tube mounted on a wheel rim.

6. The tire liner of claim 2 wherein in addition the long side to be adjacent the inner tube is also beveled.

7. In the method of forming an annular shaped tire liner from a high temperature and pressure molded and vulcanized rubber strip adapted to fit around and in contact with the inside of a casing which is part of a pneumatic tire and around and in contact with the outside of an inner tube for the tire so as to be between the inner tube and the casing and to be vulcanized to the inside of the casing without an inner tube to reduce the frequency of flat tires wherein the casing has a generally U-shaped surface inside and wherein the tire has spaced apart annular sidewalls supporting a tread the improvement which comprises providing a strip of the rubber having generally four sided cross-section such that there are two opposite long sides and two opposite short sides; and bevelling at least the long side of the strip to be adjacent the tread of the tire casing or the inside of the casing with a rubber cutting means into the short sides wherein the strip provides substantial protection against and resistance to penetration to the inside of the casing through the tread by a foreign object and wherein the strip is in compression in the casing and is bent in the U-shape of the inside of the casing and tends to straighten outside of the casing.

8. The method of claim 7 wherein a flat rectangular cross-sectioned strip with opposite ends adapted to be joined together to form the annular liner is beveled and then the ends are joined together to form the tire liner.

9. The method of claim 7 wherein a flat rectangular cross-section strip of rubber is formed into an annular ring with opposite ends joined together and then the ring is beveled to form the tire liner.

10. The method of claim 7 wherein the cutting means is a rubber grinding wheel.

* * * * *